(12) United States Patent
Kikuchi et al.

(10) Patent No.: US 7,147,886 B2
(45) Date of Patent: Dec. 12, 2006

(54) PRODUCTION METHOD FOR PROCESSED SOYBEAN FOOD PRODUCTS AND APPARATUS FOR THERMAL DEAERATION OF SOYBEAN SLURRY

(75) Inventors: Motokazu Kikuchi, Tokyo (JP); Hideo Shidara, Tokyo (JP); Masato Endo, Tokyo (JP); Shoji Wakao, Zama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 187 days.

(21) Appl. No.: 10/682,224

(22) Filed: Oct. 8, 2003

(65) Prior Publication Data

US 2004/0071849 A1 Apr. 15, 2004

Related U.S. Application Data

(63) Continuation of application No. 09/806,804, filed as application No. PCT/JP00/05140 on Jul. 31, 2000, now Pat. No. 6,688,214.

(30) Foreign Application Priority Data

Aug. 3, 1999 (JP) ................ 11-220572

(51) Int. Cl.
 *A23L 1/20* (2006.01)
(52) U.S. Cl. ............ 426/634; 426/518; 426/486; 426/507
(58) Field of Classification Search ........... 426/634, 426/518, 486, 507
See application file for complete search history.

(56) References Cited

U.S. PATENT DOCUMENTS 4,514,433 A * 4/1985 Matsuura .............. 426/634
4,884,498 A 12/1989 Sengoku et al.
6,063,204 A * 5/2000 Hester et al. ............. 127/1
6,688,214 B1 * 2/2004 Kikuchi et al. ........... 99/483

FOREIGN PATENT DOCUMENTS

| JP | 52-54069 | | 5/1977 |
|---|---|---|---|
| JP | 5-179045 | | 10/1984 |
| JP | 60-224462 | | 11/1985 |
| JP | 61-195660 | | 8/1986 |
| JP | 62-262961 | | 11/1987 |
| JP | 64-23870 | | 1/1989 |
| JP | 01117755 | | 5/1989 |
| JP | 2-49556 | | 2/1990 |
| JP | 02-049556 | * | 2/1990 |
| JP | H02-212311 A | | 8/1990 |
| JP | 4-190044 | | 7/1992 |
| JP | 8-242801 | | 9/1996 |
| SU | 274085 | * | 6/1970 |

OTHER PUBLICATIONS

Translation for JP 02-049556 published Feb. 1990. Conducted at PTO in May 13, 2005.*
Japanese Utility Model Application No. 10805/1987 (Laid-open No. 119384/1988) (Toshihiko OBA), Aug. 2, 1988.
Tsuchiya, Kanji, "Soymilk", Food Research Institute (1980) (with English translation).

* cited by examiner

*Primary Examiner*—Anthony Weier
(74) *Attorney, Agent, or Firm*—Darby & Darby

(57) ABSTRACT

The aim is to effectively remove the unpleasant raw odor that is characteristic of soybeans and provide a high quality processed soybean food product. In a production method for processed soybean food products that includes a grinding step (A) in which raw soybeans are ground to obtain a soybean slurry and a heating step (B) in which the obtained soybean slurry is heated and thermally denatured, a deaeration step (C) for removing air bubbles mixed in with the soybean slurry is performed partway through the heating step (B). It is preferable that the heating step (B) and the deaeration step (C) are performed continuously.

9 Claims, 3 Drawing Sheets

PRODUCTION METHOD FOR PROCESSED SOYBEAN FOOD PRODUCTS AND APPARATUS FOR THERMAL DEAERATION OF SOYBEAN SLURRY

This is a continuation of U.S. patent application Ser. No. 09/806,804, filed Apr. 3, 2001, which is the U.S. National phase application under 35U.S.C. §371 of international patent application No. PCT/JP00/05140, filed Jul. 31, 2001. The international application was published as WO 01/10243 A1 on Feb. 15, 2001.

TECHNICAL FIELD

The present invention relates to a method of producing processed soybean food products such as tofu, soymilk, and soybean casein (yuba) and to an apparatus for the thermal deaeration of a soybean slurry obtained by grinding soybeans, and is intended to enable the unpleasant raw odor that is characteristic of soybeans to be effectively removed.

BACKGROUND ART

Generally, when processed soybean products such as tofu, soymilk, and soybean casein (yuba) are produced, an operation to process raw soybeans and change them into a liquid form is performed.

This operation comprises: an immersion step in which raw soybeans that have been thoroughly washed are immersed in water for approximately one night until they swell to approximately twice their size; a grinding step in which a slurry is obtained by rubbing and crushing the swollen raw soybeans while adding an appropriate amount of water; and a heating step in which the soybean slurry undergoes thermal denaturation by being heated to a predetermined temperature. If required, a separation step in which solid pulp (okara) is separated may also be performed either before or after the heating step. In addition, it is also possible to omit the immersion step in cases such as when soymilk is being produced for human consumption.

By further processing the soybean slurry obtained through each of the above processes, processed soybean food products are produced. For example, tofu can be obtained by adding a coagulant to the soybean slurry so as to coagulate it.

In this type of processed soybean food products production method, the heating step renders harmless the harmful substances contained in the soybeans by the heating thereof and also simplifies the soybean protein and changes it into a state in which it can be easily digested. The heating step is thus particularly important (see page 121 of "Soymilk", by Kanji Tsuchiya, Food Research Institute, 1980).

The heating step can be separated into a temperature raising step in which the soybean slurry is heated so as to raise the temperature thereof and a thermal denaturation step in which the soybean protein is thermally denatured by maintaining the heated soybean slurry at a raised temperature for a predetermined time. However, normally, because of the type of heating apparatus used or because of the operating conditions, the soybean slurry is thermally denatured while the temperature thereof is being raised, and there is usually no distinction between the temperature raising step and the thermal denaturation step.

However, the nature of soybean protein is such that it is extremely susceptible to being permeated with air. Therefore, if the soybean slurry becomes permeated with a large amount of air in the grinding step and a large number of air bubbles become mixed in the soybean slurry, then this has a deleterious effect on the final product.

For example, if tofu is produced using soybean slurry in which air bubbles have become mixed, the finished tofu has insufficient hardness and the constituent elements of the soybeans are oxidized by the oxygen in the air bubbles resulting in the problem arising that an unpleasant raw odor is given off.

Therefore, technology for removing air bubbles from the soybean slurry using a deaerating apparatus is known as a method for solving the above types of problem. Examples of these are the technology disclosed in Japanese Unexamined Patent Application, First Publication (Kokai), No. Sho 52-54069 in which air bubbles are removed from the soybean slurry by deaeration using a deaeration apparatus before the heating step is performed, and the technology disclosed in Japanese Unexamined Patent Application, First Publication (Kokai), No. Sho 61-195660 in which a deaeration process is performed after the heating step.

However, because the soybean slurry is in a liquid-slurry form, the removal of air bubbles is extremely difficult, particularly when the temperature thereof is low which causes the viscosity to increase. Accordingly, as is disclosed in Japanese Unexamined Patent Application, First Publication (Kokai), No. Sho 52-54069, when the deaeration process is to be performed on the slurry that is at low temperature prior to the heating step being performed, the removal of the air bubbles is exceedingly difficult and it is necessary to perform the deaeration using strong suction provided by an apparatus with a complicated structure. Furthermore, because the deaeration is difficult, it is not possible to remove minute air bubbles, which has resulted in the problem arising that an unpleasant raw odor caused by the air bubbles remains in the finished product.

Moreover, after the heating step is completed, the soybean slurry absorbs the odor already generated in the soybean protein in which the thermal denaturation is well advanced and this odor becomes fixed in the soybean slurry. Therefore, as is disclosed in Japanese Unexamined Patent Application, First Publication (Kokai), No. Sho 61-195660, the problem arises that the odor has already been generated in the soybean slurry even if the air bubbles are removed from the soybean slurry that has undergone the heating step. Namely, once the odor has been generated, there has not been much point to then performing the deaeration and a satisfactory effect as regards odor removal has not been obtained.

In this way, in either of the conventional technologies in which the deaeration process is performed on the soybean slurry before or after the heating step, it has not been possible to obtain a satisfactory deodorization effect and it has thus not been possible to obtain high quality soybean food products.

Furthermore, there has not hitherto existed a thermal deaeration apparatus that combines both the function of heating the soybean slurry and the function of deaerating the soybean slurry, and the development of an apparatus that efficiently provides high quality soybean food products has long been desired.

DISCLOSURE OF THE INVENTION

The aim of the present invention is to provide a processed soybean food product of a higher quality than has been produced hitherto by removing air bubbles mixed in with the soybean slurry and effectively removing the unpleasant raw odor that is characteristic of soybeans.

The soybean production method of the present invention includes a grinding step (A) in which raw soybeans are ground to provide a soybean slurry, and a heating step (B) in which the provided soybean slurry is heated and thermally denatured, and partway through the heating step (B), a deaeration step (C) for removing air bubbles mixed in with the soybean slurry is performed.

BEST MODE FOR CARRYING OUT THE INVENTION

Figure 1:
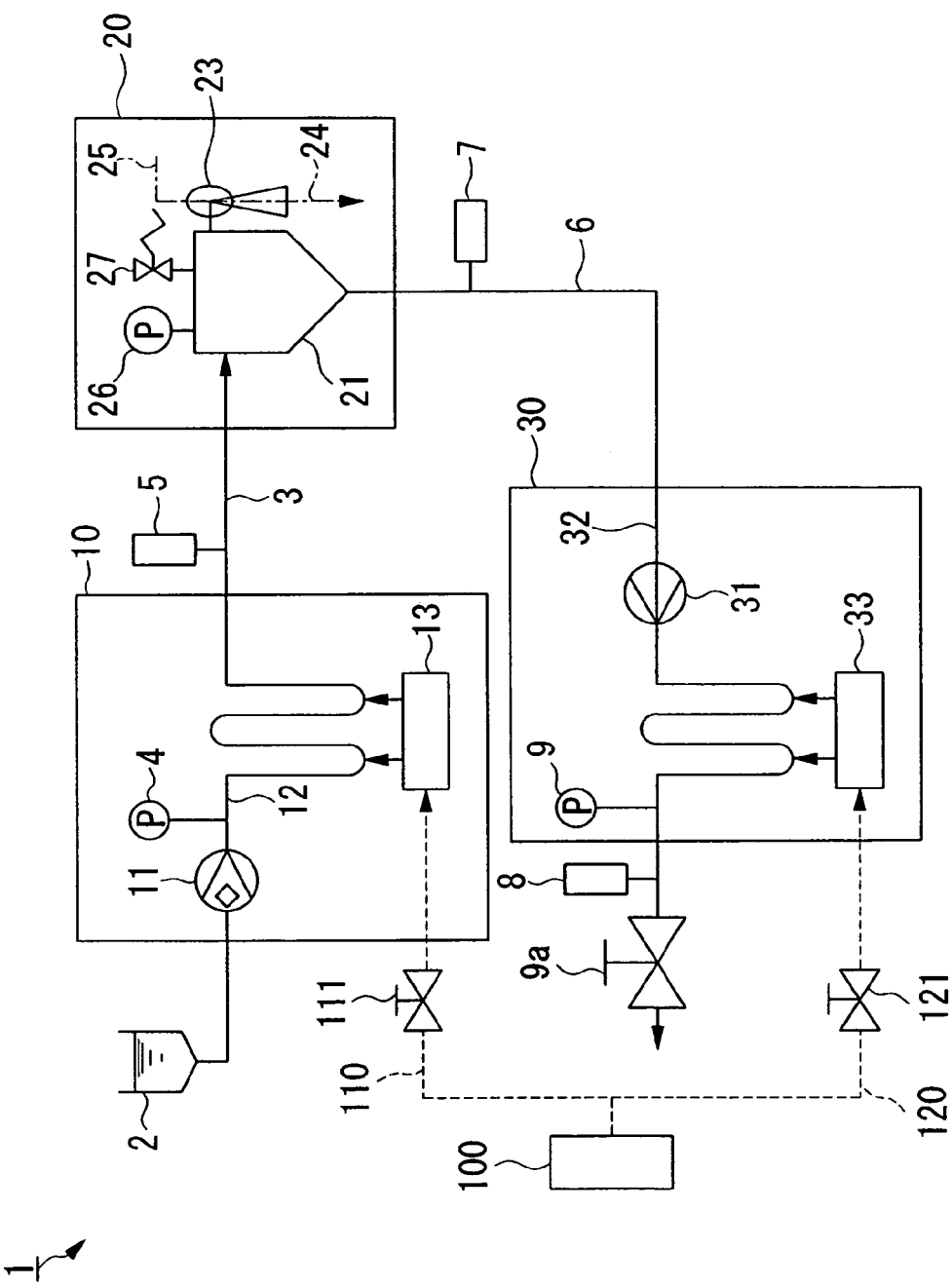
FIG. 1 is a schematic structural view showing an example of the soybean slurry thermal deaeration apparatus of the present invention.

In the above described production method, it is preferable if the heating process (B) and the deaeration step (C) are performed continuously.

It is also preferable if the heating step (B) comprises a first heating step in which a temperature of the soybean slurry is raised to a predetermined intermediate temperature and a second heating step in which the soybean slurry is further heated, and if the deaeration step (C) is performed between the first heating step and the second heating step.

Further, it is preferable if the deaeration step (C) is performed at the point when the soybean slurry reaches a temperature range of 75 to 125° C. in the heating step (B), and it is more preferable if the deaeration step (C) is performed at the point when the soybean slurry reaches a temperature range of 75 to 100° C.

It is also preferable if the deaeration step (C) is a method for removing air bubbles in which the soybean slurry is depressurized such that the temperature of the soybean slurry decreases by at least 3° C. or more.

It is also preferable if, in the heating step (B), the soybean slurry flows alternately through a large diameter pipe and a small diameter pipe. In this case, in the heating step (B), it is preferable if the soybean slurry flows alternately between a large diameter pipe arranged in a straight line and a small diameter pipe bent in a turning configuration. Furthermore it is preferable if, in the small diameter pipe that is bent in a turning configuration, the soybean slurry is heated by steam being blown into the soybean slurry.

The apparatus for thermal deaeration of a soybean slurry of the present invention comprises: a first heating apparatus that raises the temperature of the soybean slurry to a predetermined intermediate temperature; a deaeration apparatus that deaerates the soybean slurry that has reached the intermediate temperature in the first heating apparatus; and a second heating apparatus that completes thermal denaturation by further heating the soybean slurry that has been deaerated by the deaeration apparatus. It is preferable if the first heating apparatus and the second heating apparatus are provided with: a liquid feed pipe through which the soybean slurry is continuously circulated; a steam mixing apparatus that heats the soybean slurry circulating through the liquid feed pipe by mixing it with steam; and a liquid feed pump for feeding the soybean slurry into the liquid feed pipe.

It is also preferable if the liquid feed pipe comprises a continuous succession of large diameter pipes alternating with small diameter pipes, moreover, it is preferable if small diameter pipes that are bent in a turning configuration are interposed between a plurality of large diameter pipes arranged in straight lines. Furthermore, it is preferable if the steam mixing apparatus that blows steam into the soybean slurry is connected to a portion of the small diameter pipe that is bent in a turning configuration.

It is also preferable if the deaeration apparatus is provided with a deaeration chamber in which soybean slurry is stored and a suction apparatus for suctioning out air inside this deaeration chamber.

The present invention will now be described in detail.

The soybean production method of the present invention includes a grinding step (A) in which raw soybeans are ground to provide a soybean slurry and a heating step (B) in which the provided soybean slurry is heated and thermally denatured, and partway through the heating step (B), a deaeration step (C) for removing air bubbles mixed in with the soybean slurry is performed.

Partway through the heating process (B), because it is being heated, the viscosity of the soybean slurry is low and the removal of air bubbles mixed into the soybean slurry is easy. Moreover, partway through the heating step (B), the thermal denaturation has not progressed sufficiently for the odor of the soybean slurry to have been absorbed to any extent by the soybean protein at this stage. Therefore, if the deaeration step (C) is performed partway through the heating step (B), it is possible to efficiently remove the odor from the soybean slurry. Accordingly, it is possible to obtain a high deodorization effect that is not obtainable in the conventional methods in which the deaeration process is performed either before or after the heating step. Moreover, the deaeration step (C) may be performed while the heating operation is being performed or after the heating operation has been stopped.

Note that, in the production method of the present invention, when necessary, it is possible to implement before the grinding step (A) a suitable immersion step in which the raw soybeans are swelled by being immersed in water, and a separation step either before or after the heating step in which the soybean slurry is pressed and the solid pulp (okara) is separated.

The term partway through the heating step (B) means the period after heating of the soybean slurry has begun while it is higher than room temperature, and is not particularly restricted.

For example, the deaeration step (C) may be performed during the temperature raising step in which the temperature of the soybean slurry is raised by heat being applied thereto, or during the thermal denaturation step in which the soybean slurry is thermally denatured by being maintained at the raised temperature for a predetermined time. Alternatively, the deaeration step (C) may be performed between the temperature raising step and the thermal denaturation step. However, because the odor of the soybean slurry is absorbed into the soybean protein as the thermal denaturation progresses, it is preferable if the deaeration step (C) is completed before the thermal denaturation progresses too far. Further, it is preferable if the deaeration step (C) is completed before the thermal denaturation of the soybean slurry begins. Namely, in the case of this example, it is preferable if the deaeration step (C) is performed either partway through the temperature raising step or between the temperature raising step and the thermal denaturation step.

In order to perform a more effective deaeration step (C), it is preferable if the heating step (B) is formed from a first heating step in which a temperature of the soybean slurry is raised to a predetermined intermediate temperature and a second heating step in which the soybean slurry is further heated, and if the deaeration step (C) is performed between the first heating step and the second heating step.

Namely, the soybean slurry is heated to an intermediate temperature in the first heating step and subsequently the deaeration step (C) for deaerating the soybean slurry is performed. Thereafter, either the soybean slurry is maintained by the second heating step at the temperature after the deaeration step, or the temperature of the soybean slurry is raised further to a predetermined final temperature. Alternatively, after the temperature of the soybean slurry has been raised to the predetermined final temperature, it is then kept at this temperature.

Here, the intermediate temperature is preferably set in a temperature range between 75 and 125° C., more preferably between 75 and 100° C., and even more preferably between 80 and 100° C. If the temperature of the soybean slurry is less than 75° C., the viscosity of the soybean slurry is too high and it is difficult to remove the minute air bubbles in the soybean slurry, resulting in cases arising in which effective deaeration is not possible. On the other hand, in order to deactivate the oxygen in the soybean slurry, it is sufficient if the temperature of the soybean slurry is raised to 125° C. If the intermediate temperature is set in excess of 125° C., then the energy costs increase. Moreover, when the soybean slurry gets within the area of 75° C., the viscosity decreases. As a result, it is preferable if the intermediate temperature is set within the above temperature range within which the viscosity of the soybean slurry is low, the deaeration can be efficiently performed, the thermal denaturation of the soybean protein does not progress too far, and there is little waste of energy.

Because it is possible to effectively deaerate the soybean slurry by setting the intermediate temperature in this way and subsequently performing the deaeration step (C), a high deaeration effect is manifested.

When the processed soybean food product being produced here is a coagulated food product such as tofu or the like, if the temperature of the soybean slurry is raised to in excess of 100° C., the ability of the soybean slurry to coagulate is reduced, therefore, it is particularly preferable that the intermediate temperature is set within the range of 75 to 100° C.

It is preferable that the deaeration step (C) is a method for deaerating air bubbles in which the soybean slurry is depressurized such that the temperature of the soybean slurry decreases by at least 3° C. or more. It is more preferable that the temperature of the soybean slurry decreases by 3 to 15° C. This lowering of the temperature of the soybean slurry occurs because, if the pressure of the deaeration chamber is reduced, the boiling point of the soybean slurry decreases so that the soybean slurry boils more easily and the vaporization latent heat is lost in accordance with the amount of vapor generated by the soybean slurry while it is boiling.

If the deaeration step (C) is performed in a deaeration chamber having a fixed volume, then it is preferable that the pressure in the deaeration chamber is set such that the temperature of the soybean slurry after deaeration decreases by 3° C. or more compared to before the deaeration, because it is then possible to make the pressure in the deaeration chamber a pressure at which the soybean slurry boils gently and to perform efficient deaeration.

By adjusting the temperature difference of the soybean slurry before and after deaeration in this way, it is possible to adjust the pressure in the deaeration chamber and, as a result, to adjust the extent to which the soybean slurry is deaerated.

If the temperature difference of the soybean slurry before and after the deaeration step (C) is less than 3° C., the boiling of the soybean slurry is less vigorous and a sufficient deaeration effect may not be obtained. On the other hand, the larger the temperature difference of the soybean slurry before and after the deaeration step (C) the greater the deaeration effect, however, when the temperature difference increases to 15° C., then the deaeration effect is the same as when the temperature difference is below 15° C. Therefore, it is preferable in view of the deaeration affect as well as of conserving energy that the temperature difference of the soybean slurry before and after the deaeration step (C) is set to 3 to 15° C.

In accordance with the set intermediate temperature and with the temperature of the soybean slurry after the deaeration step (C), the method used for the second heating step performed after the deaeration step (C) can be appropriately selected from one of: holding the soybean slurry at the temperature thereof after the deaeration step (C); raising the temperature of the soybean slurry further to a predetermined final temperature; or raising the temperature of the soybean slurry to a predetermined final temperature and then holding it at this temperature. It is preferable that the soybean slurry be ultimately heated to between 95 and 125° C. as this causes the thermal denaturation to be completed.

For example, if the intermediate temperature is set to the comparatively low temperature of less than 95° C. and the thermal denaturation of the soybean slurry has not progressed sufficiently in the first heating step, then it is preferable that the temperature of the soybean slurry is further raised to the higher final temperature of 95 to 125° C. in the second heating step so as to advance the thermal denaturation. If the intermediate temperature is set to the comparatively high temperature of approximately 125° C. and the thermal denaturation of the soybean slurry has progressed sufficiently in the first heating step, then the temperature of the soybean slurry does not need to be raised further in the second heating step and may be held at the temperature at the completion of the deaeration step (C).

In this way, it is possible to appropriately select the extent of the heating and temperature raising in the second heating step in accordance with the intermediate temperature set in the first heating step and with the extent of the subsequent temperature reduction in the deaeration step (C). Moreover, it is also possible to make this decision in accordance with the type of processed soybean food product being produced. For example, when making a drink such as soy milk, a preferable method involves heating the soybean slurry to 105° C. in the first heating step and then lowering the temperature to approximately 100° C. in the deaeration step, and thereafter, heating the soybean slurry to 120° C. in the second heating step and holding it there for approximately 3 to 15 minutes.

In the production method of the present invention, the heating step (B) and the deaeration step (C) may be performed using a known heating apparatus and a known deaeration apparatus.

Examples of the heating apparatus include indirect heating method heating apparatuses such as a surface heat exchanger, a plate heat exchanger, a double pipe heat exchanger, a multipipe heat exchanger, a coil heat exchanger, a flat heat exchanger, and a scraped surface heat exchanger; and direct heating method heating apparatuses that mix the soybean slurry together with steam and heat this mixture such as injection types and infusion types of heating apparatuses. It is preferable that a direct heating method heating apparatus is used, as the soybean slurry can be heated efficiently. In contrast, if an indirect heating method heating apparatus is used, care needs to be taken as regards the operating conditions and operating time, as soybean protein tends to become burned and stick to the heat transfer surface of the apparatus.

In the present invention, a desirable heating apparatus is an injection method continuous heating apparatus that heats the soybean slurry by continuously blowing steam into the continuously circulating soybean slurry. As this type of apparatus, the apparatus described below, in particular, is the most desirable.

In this type of heating apparatus, at the portion where the steam is blown into the soybean slurry, steam pipes are joined onto the pipes through which the soybean slurry is circulating.

Note that, more specifically, in this case, it is possible for the steam pipes to simply be joined to the pipes through which the soybean slurry is circulating, however, it is also possible for the steam pipes to protrude into the inside of the pipes through which the soybean slurry is flowing and to provide the steam outlet at the distal end of the protruding steam pipe. In this case, it is desirable if the steam outlet opens facing the direction in which the soybean slurry is circulating (i.e. if the outlet opening faces the downstream direction of the flow of the soybean slurry). By providing the opening of the steam outlet such that it faces the downstream direction of the flow of the soybean slurry, the dynamic pressure of the soybean slurry acts on the steam outlet and a phenomenon is generated in which the stem is suctioned towards the steam outlet and the steam is blown efficiently into the soybean slurry.

In the heating apparatus of the present invention, it is desirable that the diameter (i.e. inner diameter) of the pipe through which the soybean slurry circulates is designed to be narrow at the portion where the steam is blown into the soybean slurry, as described above.

By making the diameter of the pipe through which the soybean slurry is circulating small in this way, the speed at which the soybean slurry circulates is increased resulting in the dynamic pressure of the soybean slurry increasing and thereby decreasing the static pressure. Therefore, the action of suctioning the steam in the steam outlet is strengthened and the efficiency of the steam blowing is improved providing an effect of stirring the soybean slurry.

The pipes through which the soybean slurry circulates is formed with an appropriate turning structure, for example, it may be formed in a U shape (this is so as to reduce the area covered by the apparatus), and the heating apparatus of the present invention desirably is designed such that the diameter of the pipes through which the soybean slurry circulates is also made smaller in these locations where the pipes through which the soybean slurry circulates are made to turn.

Thus, by making the diameter of the pipes smaller in the locations where the pipes through which the soybean slurry circulates are made to turn, the flow speed of the circulating soybean slurry changes and an ideal mixing state is achieved in which the soybean slurry is thoroughly agitated. Therefore, the characteristic effect is obtained that the protein component contained in the circulating soybean slurry is uniformly mixed.

In this case, it is desirable that the diameter of the turning portion is in the range of ¾ to ⅕ of the diameter of the pipe through which the soybean slurry is circulating.

Furthermore, because, air bubbles are generally generated if the soybean slurry is stirred too vigorously, it is preferable if the soybean slurry is normally made to circulate in a piston flow state inside the pipe through which the soybean slurry is circulating.

By heating and deaerating the soybean slurry as it is made to circulate in a piston flow state while being vigorously agitated in this way, the present invention is able to achieve a further remarkable effect.

Any apparatus may be used for the deaeration apparatus provided that it is able to remove air bubbles from the soybean slurry, however, it is preferable if an apparatus that is provided with a deaeration chamber and a suction apparatus for suctioning out air from inside this deaeration chamber is used, and in which soybean slurry is stored in the deaeration chamber and the pressure inside the deaeration chamber is reduced when the air is suctioned out from the deaeration chamber, as this allows an excellent deaeration effect to be achieved using a simple structure. Additional examples include a fluid cyclone which circulates the liquid so as to generate centrifugal force and collect air bubbles in the center portion of the circulation due to the buoyancy opposing the centrifugal force, and then removes the air bubbles from this center portion; and a centrifugal separator which removes the air bubbles by circulating the liquid in the same way using mechanical power.

Moreover, in the production method of the present invention, the heating step (B) and the deaeration step (C) may be used for batch processing or may be performed continuously.

If they are used for batch processing, then, one example thereof is a method in which the soybean slurry is placed and sealed inside a sealable container and the first heating step is performed by heating this sealed container, and then, at the point when the soybean slurry reaches a predetermined intermediate level temperature, the deaeration step (C) is performed by suctioning out the interior of the container, and thereafter the second heating step to further heat the soybean slurry is performed.

It is possible to efficiently perform the heating step (B) and the deaeration step (C) using this type of batch processing method, however, in order to more efficiently perform these steps, it is preferable that the heating step (B) and the deaeration step (C) be performed continuously.

For example, the heating step (B) and the deaeration step (C) can be continuously performed by using a thermal deaeration apparatus in which a plurality of continuous type heating apparatuses are connected in series and a continuous type deaeration apparatus is provided between each heating apparatus, and by continuously circulating soybean slurry through this apparatus. It is not necessary that only one continuous type deaeration apparatus be provided between the heating apparatuses and it is possible to provide two or more between heating apparatuses. It is also preferable that other steps such as the separation step and the grinding step are also performed continuously if the heating step (B) and the deaeration step (C) are being performed continuously.

By performing continuous processing on the soybean slurry in this manner, a large scale, large production volume can be achieved.

FIG. 1 is a schematic structural view showing an embodiment of the thermal deaeration apparatus 1 of the present invention. It is preferable that this apparatus 1 is used as it enables the heating step (B) and the deaeration step (C) to be performed continuously and efficiently.

The thermal deaeration apparatus 1 is provided with a first heating apparatus 10 for raising the temperature of the soybean slurry to a predetermined intermediate temperature; a deaeration apparatus 20 for deaerating the soybean slurry once it has reached the intermediate temperature in the first heating apparatus 10; and a second heating apparatus 30 for completing the thermal denaturation by further heating the soybean slurry once it has been deaerated in the deaeration apparatus 20.

The thermal deaeration apparatus 1 is also provided with a soybean slurry storage tank 2 in which the soybeans slurry is stored before it is heated. The soybean slurry inside this soybean slurry storage tank 2 is fed into a feed pipe 12 of the first heating apparatus 10 by a metering feed pump 11. After being heated, the soybean slurry then circulates in turn through the deaeration apparatus 20 and the second heating apparatus 30.

The first heating apparatus 10 and the second heating apparatus 30 are equipped with feed pipes 12 and 32 through which the soybean slurry continuously circulates; steam feed apparatuses 13 and 33 via which high temperature steam is fed into the soybean slurry circulating through the feed pipes 12 and 32; and feed pumps 11 and 31 for feeding the soybean slurry into the feed pipes 12 and 32. Therefore, it is possible to feed soybean slurry at an optional flow rate into the feed pipes 12 and 32 in the first heating apparatus 10 and the second heating apparatus 20, and to heat this soybean slurry circulating through the feed pipes 12 and 32 by directly mixing steam into it. Steam is supplied to the steam feed apparatuses 13 and 33 from a steam supply unit 100 via branch pipes 110 and 120. The steam feed apparatuses 13 and 33 are not limited provided they are capable of directly feeding steam to the feed pipes 12 and 32, and it is also possible for a check valve or the like to be provided so that the soybean slurry does not flow into the steam feed pipes 13 and 33. The steam supply rate can be controlled by pressure regulating valves 111 and 121.

The deaeration apparatus 20 is equipped with a deaeration chamber 21 for temporarily holding the soybean slurry and a suction apparatus for suctioning out the air in the deaeration chamber 21. An ejector 23 that suctions out the air using the dynamic pressure of a water jet, or a commonly known vacuum pump, or the like may be used as the suction apparatus. Note that, in FIG. 1, the symbol 24 indicates a water pipe and the end 25 of the water pipe is connected to an unillustrated water source. Note that the single dot chain line shown here shows the flow of water used to drive the ejector 23.

It is preferable that a large surface area of the soybean slurry inside the deaeration chamber 21 is in contact with the air, therefore, it is preferable that the soybean slurry that has been heated by the first heating apparatus 10 comes into as much contact with the air as possible when it is introduced into the deaeration chamber 21. For example, if the end of the feed pipe 3 that is connected to the deaeration chamber 21 from the first heating apparatus 10 is connected in a manner in which it runs along the inner wall surface of the deaeration chamber 21, the soybean slurry that flows into the deaeration chamber 21 is circulated inside the deaeration chamber 21 along the inner wall surface, resulting in a large area being in contact with the air. Other examples include a method in which the soybean slurry is made to flow from the top of the inside of the deaeration chamber 21 in a thin film along the inner wall surface of the deaeration chamber 21; a method in which the soybean slurry falls like a curtain from the top of the inside of the deaeration chamber 21; a method in which the soybean slurry falls in a plurality of lines from the top of the inside of the deaeration chamber 21; and a method in which the soybean slurry falls in droplets. However, when the viscosity of the soybean slurry is high, there is no need for the surface area of the soybean slurry that is in contact with the air to be so large, and it is sufficient if the soybean slurry is simply allowed to flow into the deaeration chamber 21.

The method of thermally deaerating the soybean slurry using the thermal deaeration apparatus 1 will now be described.

The soybeans slurry stored in the soybean slurry storage tank 2 is circulated through the feed pipe 12 of the first heating apparatus 10 by the metering fuel pump 11. Steam used for heating is blown from the steam supply apparatus 13 into the soybean slurry inside the feed pipe 12 thereby heating the soybean slurry to an intermediate temperature. The temperature and pressure of the soybean slurry can each be confirmed using a temperature gauge 5 and pressure gauge 4, respectively. Moreover, the temperature of the soybean slurry can be adjusted by increasing or decreasing the amount of steam by adjusting the amount of the opening of the pressure regulating valve 111 of the steam supply unit 100.

The soybean slurry that has been heated to the intermediate temperature is fed to the deaeration apparatus 20 through the feed pipe 3 and flows into the deaeration chamber 21 of the deaeration apparatus 20. The air inside the deaeration chamber 21 is suctioned by the ejector 23 depressurizing the interior of the deaeration chamber 21 and deaerating the soybean slurry. The pressure inside the deaeration chamber 21 can be monitored using the pressure gauge 26 and, in addition, the pressure inside the deaeration chamber 21 can be controlled using the vacuum breaker 27 such that the pressure inside the deaeration chamber 21 does not become too low. During the deaeration, the values shown by the temperature gauge 5 and the temperature gauge 7 are closely observed, and the extent of the suction is controlled such that the difference in temperature between the inlet side and the outlet side of the deaeration chamber 21, namely, the difference in temperature before and after deaeration is a predetermined value.

The soybean slurry that has passed through the deaeration chamber 21 arrives at the second heating apparatus 30 via the feed pipe 6. In the same way as in the first heating apparatus 10, in the second heating apparatus 30, the soybean slurry is fed to the feed pipe 32 by the feed pump 31 and steam used for heating is blown from the steam supply apparatus 33 into the soybean slurry inside the feed pipe 32, thereby further heating the soybean slurry. The temperature of the soybeans slurry at this point can be confirmed using the temperature gauge 8. The soybean slurry can also be controlled using the pressure gauge 9 and the back pressure regulating valve 9a so that it is heated to a point where it does not boil.

The soybean slurry that has completed thermal denaturation in the second heating apparatus 30 can be used for various processed soybean food products such as silk tofu, cotton tofu, secondary tofu products such as fried tofu and dried tofu, various other types of processed tofu, drinks such as soy milk, soybean casein (yuba), freeze dried tofu, and the like. In addition, these processed soybean products are not limited to food products for human consumption, and the soybean slurry may be used in animal feed as well.

Figure 2:
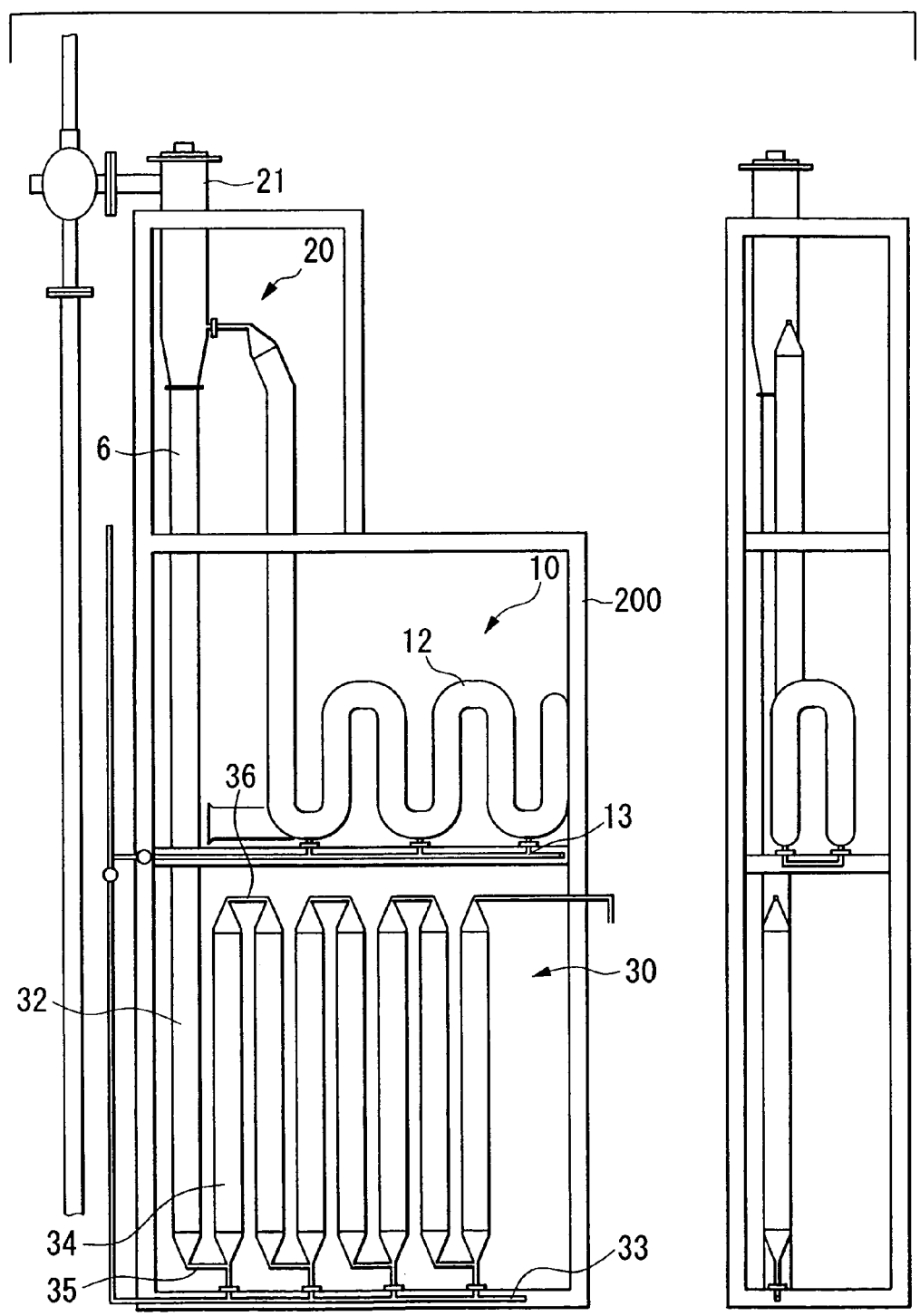
FIG. 2 is a view showing the exterior appearance of another example of the soybean slurry thermal deaeration apparatus of the present invention.
Figure 3:
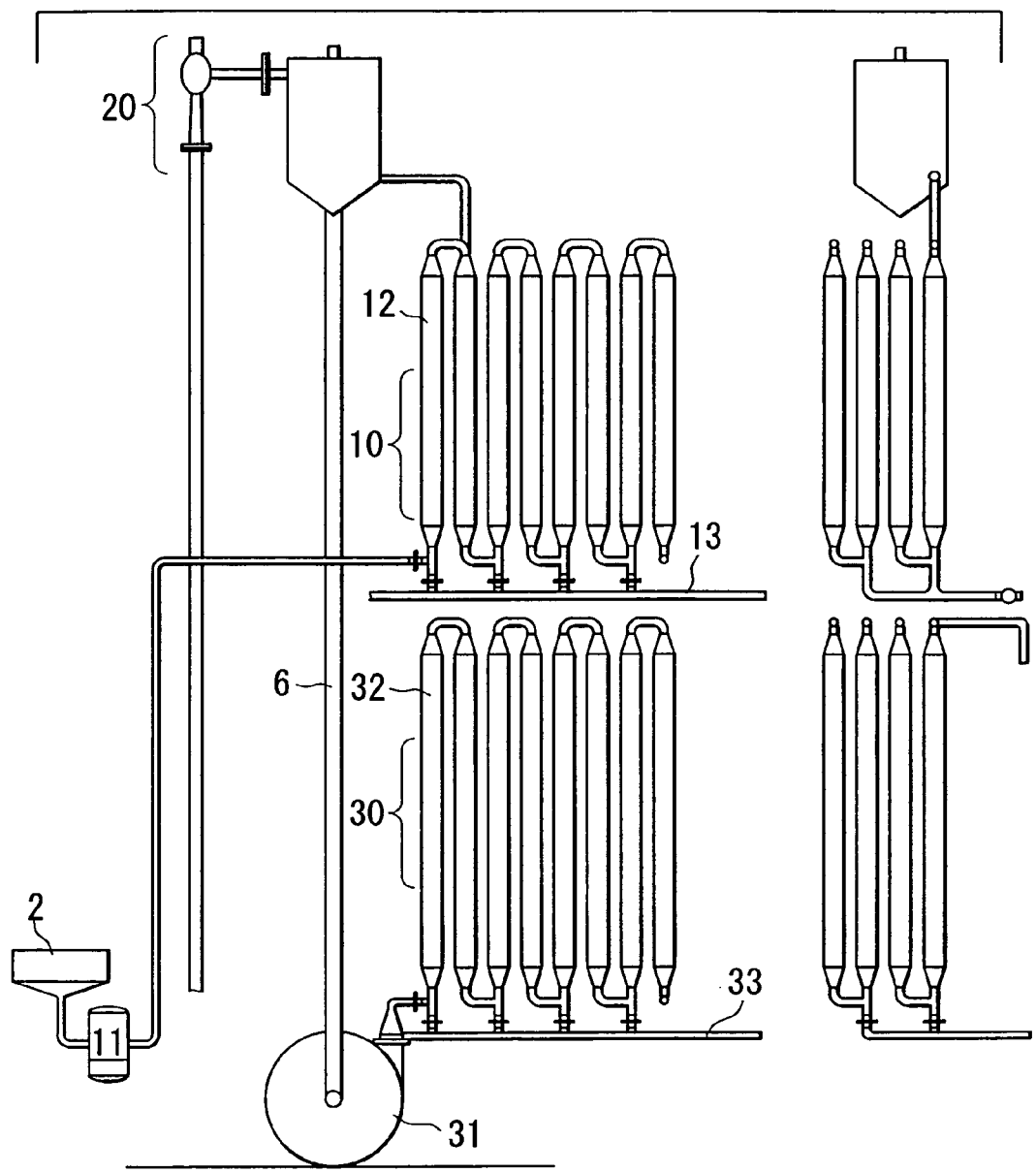
FIG. 3 is a view showing the exterior appearance of yet another example of the soybean slurry thermal deaeration apparatus of the present invention.

Next, specific modes of the thermal deaeration apparatus 1 in the above FIG. 1 will be described. FIGS. 2 and 3 show exterior views of other embodiments of the soybean slurry thermal deaeration apparatus of the present invention.

In FIG. 2 or FIG. 3, the same descriptive symbols as used in FIG. 1 are used for elements that are common to FIG. 1 and a detailed description thereof is omitted. Note that, in FIG. 2 or FIG. 3, not all the elements shown in FIG. 1 are illustrated and the illustration of a portion of the elements has been omitted.

In FIG. 2, the first heating apparatus 10, the deaeration apparatus 20, and the second deaeration apparatus 30 are each fixed to a common frame 200.

In the first heating apparatus 10, the feed pipe 12 is formed from sanitary pipe made from 2 inch stainless steel. This type of feed pipe 12 is provided in the frame 200 in a configuration comprising a series of suitable turns with the aim of reducing the surface area of the installation and the pipe ultimately leads to the deaeration apparatus 20.

The second heating apparatus 30 is connected downstream from the deaeration apparatus 20 and the structure of this second heating apparatus 30 is particularly distinctive.

Namely, in the second heating apparatus 30, in the same way as in the first heating apparatus 10, the feed pipe 32 is provided with rectilinear pipes 34 (2 inch pipe) and these rectilinear pipes (for example, 34) are provided in the frame 200 in a configuration that comprises a series of turns. Moreover, the steam feed apparatus 33 is connected to a turning pipe 35 at the bottom end of the feed pipe 32 and the diameter of the turning pipes 35 is designed to be smaller than the diameter of the rectilinear pipes 34. In FIG. 2, the diameter of each turning pipe 35 is 10 mm.

In the same way, the diameter of the turning pipes (for example, 36) at the top end of the feed pipe 32 is designed to be smaller than the diameter of the rectilinear pipes 34 (i.e. 10 mm).

Thus, in the second heating apparatus 30 shown in FIG. 2, because the soybean slurry passes alternately through a large diameter rectilinear pipe (2 inch—for example, 36) and a small diameter turning pipe (10 mm, for example, 35, 36), the soybean slurry flows in a vigorously stirred state resulting in the protein contained in the soybean slurry being uniformly heated and having a beneficial effect on the finally obtained product. Note that, in this case, the soybean slurry is flowing in a piston flow.

In the apparatus shown in FIG. 3 as well, in the same way as in FIG. 2, the first heating apparatus 10 in the case of FIG. 3 is designed in the same way as the second heating apparatus 30 as a combination of large diameter rectilinear pipes (2.5 inch) and small diameter turning pipes (1 inch).

According to this type of production method for soybeans, because the deaeration step (C) for removing the air bubbles mixed into the soybean slurry is performed partway through the heating step (B), the soybean slurry is heated and therefore the viscosity is low and the air bubbles mixed into the soybean slurry can be easily removed. Moreover, partway through the heating step (B), the thermal denaturation has not progressed too far and the odor of the soybean slurry has not been absorbed to any large extent by the soybean protein. Therefore, if the deaeration step (C) is performed partway through the heating step (B), it is possible to efficiently remove the odor from the soybean slurry. Accordingly, it is possible to obtain an excellent deodorizing effect that has been unobtainable in the conventional methods in which the deaeration step (C) is performed either before or after the heating step (B).

Furthermore, by performing the heating step (B) and the deaeration step (C) continuously, the processed soybean food products can be produced more efficiently.

Moreover, by performing the deaeration step (C) at the point in the g¥heating step (B) when the soybean slurry is in the temperature range of 75 to 125° C., and more preferably, in the temperature range of 75 to 100° C., it is possible to deaerate the soybean slurry while wasting very little energy.

In addition, by removing the air bubbles while depressurizing the soybean slurry in the deaeration step (C) such that the temperature of the soybean slurry decreases by at least 3° C. or more, it is possible to obtain an excellent deaeration effect using little energy.

Further, because this type of thermal deaeration apparatus 1 is provided with a first heating apparatus 10 for raising the temperature of the soybean slurry to a predetermined intermediate temperature; a deaeration apparatus 20 for deaerating the soybean slurry once it has reached the intermediate temperature in the first heating apparatus 10; and a second heating apparatus 30 for completing the thermal denaturation by further heating the soybean slurry once it has been deaerated in the deaeration apparatus 20, the soybean slurry is heated to an appropriate degree and it is possible to deaerate the soybean slurry at an ideal time before the thermal denaturation and to obtain a soybean slurry in which the odor is suppressed. Accordingly, it is possible to continuously and effectively thermally deaerate the soybean slurry and to remove even minute air bubbles using a simple structure more effectively than when the deaeration apparatus is provided upstream from the first heating apparatus or than when the deaeration apparatus is provided downstream from the second heating apparatus, and the subsequent deodorizing effect is most remarkable.

Moreover, by using the deaeration apparatus 20 that is equipped with the deaeration chamber 21 for temporarily holding the soybean slurry and the suction apparatus for suctioning out the air in the deaeration chamber 21, it is possible to obtain an excellent deaeration effect using a simple apparatus.

EXAMPLES

The present invention is described in detail below using examples.

Example 1

Soybean slurry was thermally deaerated using the soybean slurry thermal deaeration apparatus 1 shown in FIGS. 1 and 2 to produce soymilk. The production method used is given below.

(1) Immersion Step 60 kg of American soybeans (IOM: imported by Mitsui & Co., Ltd.) were washed and hulled and then were made to swell by being immersed in flowing water for 12 hours.

(2) Grinding Step

The swollen soybeans obtained in the immersion step were supplied together with 170 kg of water to a grinder (manufactured by Nagasawa Kikai Seisakusho Co., Ltd.) and the soybeans were ground so that approximately 220 kg of soybean slurry (i.e. raw soy) was obtained.

(3) Thermal Deaeration Step

The soybean slurry (raw soy) obtained in the grinding step was circulated through the thermal deaeration apparatus 1 shown in FIG. 1, and a heating step and a deaeration step were performed under the operating conditions given below.

Soybean slurry (raw soy) was stored in the soybean slurry storage tank 2 shown in FIG. 1 at a temperature of 11° C. It was then circulated through the first heating apparatus 10 and heated to an intermediate temperature of 70° C. (the value of the temperature inside the first heating apparatus indicated by the temperature gauge 5) over a period of 4 minutes 30 seconds. Next, the heated soybean slurry was fed to the deaeration apparatus 20 and the ejector 23 of the deaeration apparatus was operated. The air inside the deaeration chamber 21 was then suctioned out so that the soybean slurry was deaerated. The value indicated by the temperature gauge 7 at this time, namely, the temperature after deaeration was 65° C., giving a temperature difference before and after deaeration of 5° C. Moreover, the pressure inside the deaeration chamber 21 (which value was indicated by the pressure gauge 26) at this time was −0.076 MPa. These values are shown in Table 1.

After completing the deaeration in the deaeration apparatus 20, the soybean slurry was circulated at the second heating temperature and was heated to a final temperature of 100° C. (the value of the temperature inside the second heating apparatus indicated by the temperature gauge 8) over a period of 5 minutes 30 seconds. It was then held at this temperature. The soybean slurry was thus deaerated and the thermal denaturation was completed.

(4) Separation Step

The soybean slurry (cooked soy) obtained in the thermal deaeration step was immediately separated into soymilk and solid pulp (okara) using a press (manufactured by Arai Tekkosho (Arai Iron Works Co., Ltd.)) and cooled so that approximately 190 kg of soymilk was obtained. The solid component of the obtained soymilk was 13.0% (by weight).

Sensory testing was performed on the taste of the obtained soybean slurry using the evaluation method given below by a panel of 20 men and women between the ages of 20 and 40.

Each member of the panel evaluated the test sample using the four levels given below, the average of all the panelists was then taken and the evaluation points for each test sample were calculated.

0 points→good taste
1 point→reasonable taste (slight soybean odor)
2 points→somewhat unpleasant taste (strong soybean odor)
3 points→bad taste (soybean odor too strong for use as a drink)

The calculated evaluation points were then divided again into four levels indicated by X, Δ, ○, and ⊙.

⊙→less than 0.5 points
○→0.5 points or more—less than 1.5 points
Δ→1.5 points or more—less than 2.5 points
X 2.5 points or more—less than 3.0 points The evaluation results are shown in Table 1.

Examples 2 to 9

The intermediate temperature (i.e. The value indicated by the temperature gauge 5) was changed so that the temperature difference before and after deaeration and the pressure in the deaeration chamber (i.e. The value indicated by the pressure gauge 26), and the final temperature (i.e. The value indicated by the temperature gauge 8) became the values shown in Table 1. Other than this, the soymilk was produced and evaluated in the same way as in Example 1.

The evaluation results are shown in Table 1.

Comparative Example 1

As the thermal deaeration apparatus, the deaeration apparatus 20, the first heating apparatus 10, and the second heating apparatus 30 were connected in that sequence and, other than the connection sequence being different, the same substances as were used in Example 1 and the same thermal deaeration apparatus was used to produce soymilk. The obtained soymilk was evaluated in the same way as in Example 1. The evaluation results are shown in Table 2.

Note that, the temperature of the soybean slurry before and after deaeration, the pressure inside the deaeration chamber, the intermediate temperature, and the final temperature in this case are also shown in Table 2.

Comparative Example 2

As the thermal deaeration apparatus, the first heating apparatus 10, the second heating apparatus 30, and the deaeration apparatus 20 were connected in that sequence and, other than the connection sequence being different, the same substances as were used in Example 1 and the same thermal deaeration apparatus was used to produce soymilk. The obtained soymilk was evaluated in the same way as in Example 1. The evaluation results are shown in Table 3.

Note that, the intermediate temperature, the final temperature, the temperature of the soybean slurry before and after deaeration, and the pressure inside the deaeration chamber in this case are also shown in Table 3.

TABLE 1

| Example Number | Intermediate temperature [° C.] | Temperature after deaeration [° C.] | Temperature difference before and after deaeration [° C.] | Pressure in deaeration chamber [MPa] | Final temperature [° C.] | Evaluation |
|---|---|---|---|---|---|---|
| Example 1 | 70 | 65 | 5 | −0.076 | 100 | Δ |
| Example 2 | 75 | 70 | 5 | −0.071 | 100 | ○ |
| Example 3 | 80 | 75 | 5 | −0.064 | 100 | ⊙ |
| Example 4 | 85 | 80 | 5 | −0.055 | 100 | ⊙ |
| Example 5 | 90 | 85 | 5 | −0.045 | 100 | ⊙ |
| Example 6 | 94 | 89 | 5 | −0.03S | 100 | ⊙ |
| Example 7 | 95 | 90 | 5 | −0.033 | 100 | ⊙ |
| Example 8 | 100 | 92 | 8 | −0.028 | 100 | ⊙ |
| Example 9 | 105 | 95 | 10 | −0.020 | 100 | ⊙ |

TABLE 2

| Comparative Example Number | Temperature before deaeration [° C.] | Temperature after deaeration [° C.] | Pressure in deaeration chamber [MPa] | Intermediate temperature [° C.] | Final temperature [° C.] | Evaluation |
|---|---|---|---|---|---|---|
| Comparative Example 1 | 22 | 22 | −0.050 | 85 | 100 | X |

TABLE 3

| Comparative Example Number | Intermediate temperature [° C.] | Final temperature [° C.] | Temperature before deaeration [° C.] | Temperature after deaeration [° C.] | Pressure in deaeration chamber [MPa] | Evaluation |
|---|---|---|---|---|---|---|
| Comparative Example 2 | 85 | 100 | 90 | 85 | −0.050 | X |

As is clear from Tables 1 to 3, each test sample produced in the examples had a better taste than the test samples of the comparative examples. Among these, the test sample whose intermediate temperature was set to 75° C. or more had a particularly good taste. Moreover, when the intermediate temperature was set within the range of 80° C. or more, the evaluation was particularly high.

As a result, it was determined that a far higher quality processed soybean food product is obtained in the method of these examples than in the conventional technology shown in the comparative examples. Moreover, it was determined, in particular, that the best results are obtained when the deaeration step is performed at the stage when the soybean slurry reaches the temperature range of 75° C., and more preferably, 80° C. in the heating step.

Note that, although it is omitted here, various tests were performed with various alterations such as the type of soybean, the grinding conditions, the density of the soybean slurry, the performance or otherwise of the separation step before heating, the deaeration conditions, and the like, however, substantially the same results were obtained.

Examples 10 to 18

Apart from the intermediate temperature (i.e. The value indicated by the temperature gauge 5) being set to 94° C. and the temperature of the soybean slurry after deaeration (i.e. The value indicated by the temperature gauge 7) being set to the temperatures shown in Table 4, soymilk of differing deaeration levels was produced in the same way as in Example 1. The obtained soymilk was evaluated in the same way as in Example 1. The evaluation results are shown in Table 4. Note that the pressure inside the deaeration chamber 21 (i.e. The value indicated by the pressure gauge 26) and the final temperature (i.e. The value indicated by the temperature gauge 8) are also shown in Table 4.

TABLE 4

| Example Number | Intermediate temperature [° C.] | Temperature after deaeration [° C.] | Temperature difference before and after deaeration [° C.] | Pressure in deaeration chamber [MPa] | Final temperature [° C.] | Evaluation |
|---|---|---|---|---|---|---|
| Example 10 | 94 | 94 | 0 | −0.020 | 100 | Δ |
| Example 11 | 94 | 93 | 1 | −0.025 | 100 | Δ |
| Example 12 | 94 | 92 | 2 | −0.028 | 100 | Δ |
| Example 13 | 94 | 91 | 3 | −0.031 | 100 | ○ |
| Example 14 | 94 | 90 | 4 | −0.033 | 100 | ◎ |
| Example 15 | 94 | 89 | 5 | −0.036 | 100 | ◎ |
| Example 16 | 94 | 88 | 6 | −0.038 | 100 | ◎ |
| Example 17 | 94 | 87 | 7 | −0.041 | 100 | ◎ |
| Example 18 | 94 | 86 | 8 | −0.043 | 100 | ◎ |

As is clear from Table 4, when the temperature difference before and after deaeration is 3° C. or more, the taste is improved and the taste is improved even more when the temperature difference is 4° C. or more.

As a result, it was determined that the best results are obtained in the method of these examples if the deaeration chamber is suctioned at a pressure at which the temperature of the soybean slurry after deaeration is at least 3° C. or more, and preferably 4° C. or more, lower than the temperature thereof before deaeration.

Note that, although it is omitted here, various tests were performed with various alterations such as the type of soybean, the grinding conditions, the density of the soybean slurry, the performance or otherwise of the separation step before heating, the deaeration conditions, and the like, however, substantially the same results were obtained.

Example 19

Cotton tofu was produced using soybean slurry obtained using the soybean slurry thermal deaeration apparatus 1 shown in FIGS. 1 and 3. The production method used is given below.

(1) Immersion Step 60 kg of American soybeans (IOM: imported by Mitsui & Co., Ltd.) were washed and then were made to swell by being immersed in flowing water for 12 hours.

(2) Grinding Step

The swollen soybeans obtained in the immersion step were supplied together with 570 kg of water to a grinder (manufactured by Nagasawa Kikai Seisakusho Co., Ltd.) and the soybeans were ground so that approximately 620 kg of soybean slurry (i.e. raw soy) was obtained.

(3) Thermal Deaeration Step

The soybean slurry (raw soy) obtained in the grinding step was circulated through the thermal deaeration apparatus 1 shown in FIG. 1, and a heating step and a deaeration step were performed under the operating conditions given below.

Soybean slurry (raw soy) was stored in the soybean slurry storage tank 2 shown in FIG. 1 at a temperature of 11° C. It was then circulated through the first heating apparatus 10 and heated to an intermediate temperature of 94° C. (i.e. The value indicated by the temperature gauge 5) over a period of 4 minutes 30 seconds.

The ejector 23 of the deaeration apparatus 20 was then operated and the air inside the deaeration chamber 21 was suctioned out so that the soybean slurry was deaerated. The value indicated by the temperature gauge 7 at this time was 89° C. giving a temperature difference before and after deaeration of 5° C. Moreover, the pressure inside the deaeration chamber 21 (i.e. The value indicated by the pressure gauge 26) at this time was −0.035 MPa.

After completing the deaeration in the deaeration apparatus 20, the soybean slurry was circulated in the second heating apparatus 30 and was heated from 89° C. to a final temperature of 100° C. (the value indicated by the temperature gauge 9) over a period of 5 minutes 30 seconds. It was then held at this temperature.

(4) Separation Step

The soybean slurry (cooked soy) obtained in the heating step was immediately separated into soymilk and solid pulp (okara) using a press (manufactured by Arai Tekkosho) and cooled so that approximately 600 kg of soymilk was obtained. The solid component of the obtained soymilk was 4.5% (by weight).

(5) Coagulation Step

After 100 kg of the soymilk was cooled to 70 to 75° C., calcium sulfate (manufactured by Tomita Pharmaceutical Co., Ltd.) that had been suspended in warm water was added at a density of 7.8% of the soymilk solid component and mixed in. It was then left for 10 minutes.

2 After the obtained coagulated substance had been lightly broken down, it was moved to a die case and pressed for 20 minutes so that approximately 80 kg of tofu was obtained. This tofu was then soaked in water and cooled, and was then cut so that cotton tofu was obtained. The water content of the cotton tofu was 87% (by weight).

(6) Evaluation of the Cotton Tofu

The hardness of the obtained cotton tofu was excellent while the unpleasant raw odor characteristic of soybeans was completely absent giving the product an extremely fine taste.

INDUSTRIAL APPLICABILITY

As has been described above, according to the soybean production method of the present invention, because the deaeration step (C) for removing air bubbles mixed into the soybean slurry is performed partway through the heating step (B), because it is being heated, the viscosity of the soybean slurry is low and the removal of air bubbles mixed into the soybean slurry is easy. Moreover, partway through the heating step (B), the thermal denaturation has not progressed sufficiently for the odor of the soybean slurry to have been absorbed to any extent by the soybean protein. Therefore, if the deaeration step (C) is performed partway through the heating step (B), it is possible to efficiently remove the odor from the soybean slurry. Accordingly, it is possible to obtain a high deodorization effect that is not obtainable in the conventional methods in which the deaeration process is performed either before or after the heating step.

Moreover, by performing the heating step (B) and the deaeration step (C) continuously, processed soybean food products can be produced more efficiently.

Further, by performing the deaeration step (C) at the point in the heating step (B) when the soybean slurry has reached a temperature range of 75 to 125° C., and preferably, a temperature range of 75 to 100° C., it is possible to deaerate the soybean slurry with little waste of energy.

Moreover, by removing the air bubbles while depressurizing the soybean slurry in the deaerating step (C) such that the temperature of the soybean slurry decreases by 3° C. or more, it is possible to obtain an excellent deaeration effect using little energy.

In the heating process (B), by making the soybean slurry flow alternately through large diameter pipes and small diameter pipes, the soybean slurry can be vigorously mixed and stirred. Moreover, generally, if the soybean slurry is stirred too vigorously, it tends to become permeated with air bubbles, however, if the above structure is employed, because the soybean slurry can be constantly made to flow in a piston flow through the inside of the pipes, the appropriate stirring effect can be obtained.

Moreover, in particular, in the heating step (B), by making the soybean slurry flow alternately through large diameter pipes arranged rectilinearly and small diameter pipes bent in a turning configuration, the flow rate of the circulating soybean slurry changes and an ideal vigorous mixing state of the soybean slurry is achieved. Therefore, the characteristic effect is achieved that the protein element contained in the soybean slurry is uniformly mixed.

Further, by heating the soybean slurry by blowing steam into it in the small diameter pipes that are bent in a turning configuration, the flow rate of the soybean slurry is raised, the dynamic pressure of the soybean slurry is increased, the action of suctioning the steam in the steam outlet is strengthened, and the efficiency of the steam feeding is improved. In addition to this, an effect of stirring the soybean slurry is obtained.

Moreover, because this type of thermal deaeration apparatus is provided with a first heating apparatus for raising the temperature of the soybean slurry to a predetermined intermediate temperature; a deaeration apparatus for deaerating the soybean slurry once it has reached the intermediate temperature in the first heating apparatus; and a second heating apparatus for completing the thermal denaturation by further heating the soybean slurry once it has been deaerated in the deaeration apparatus, the soybean slurry is heated to an appropriate degree and it is possible to deaerate the soybean slurry at an ideal time before the thermal denaturation and to obtain a soybean slurry in which the odor is suppressed. Accordingly, it is possible to continuously and effectively thermally deaerate the soybean slurry and to remove even minute air bubbles using a simple structure more effectively than when the deaeration apparatus is provided upstream from the first heating apparatus or than when the deaeration apparatus is provided downstream from the second heating apparatus, and the subsequent deodorizing effect is most remarkable.

By alternately connecting large diameter pipes and small diameter pipes to form the feed pipe, the soybean slurry can be vigorously mixed and stirred. Moreover, generally, if the soybean slurry is stirred too vigorously, air bubbles are generated, however, if this structure is employed, because the soybean slurry can be constantly made to flow in a piston flow through the inside of the pipes, the appropriate stirring effect can be obtained.

By employing a structure in which small diameter pipes that are bent in a turning configuration are interposed between a plurality of large diameter pipes arranged in straight lines, the flow rate of the circulating soybean slurry changes and an ideal vigorous mixing state of the soybean slurry is achieved. Therefore, the characteristic effect is achieved that the protein element contained in the soybean slurry is uniformly mixed.

Further, by connecting a steam feed apparatus for blowing steam into the soybean slurry to a portion of the small diameter pipes that are bent in a turning configuration, the flow rate of the soybean slurry is raised, the dynamic pressure of the soybean slurry is increased, the action of suctioning the steam in the steam outlet is strengthened, and the efficiency of the steam feeding is improved. In addition to this, an effect of stirring the soybean slurry is obtained.

Moreover, by using a deaeration apparatus equipped with a deaeration chamber for temporarily holding the soybean slurry and a suction apparatus for suctioning out the air in the deaeration chamber, an excellent deaeration effect can be obtained using a simple structure.

The invention claimed is:

1. A production method for processed soybean food products, comprising the steps of:
    (A) grinding raw soybeans to produce a soybean slurry;
    (B) heating the soybean slurry so that the soybean slurry is thermally denatured, wherein
    in the heating step (B), the soybean slurry is flowed alternately between a large diameter pipe arranged in a straight line and a small diameter pipe bent in a turning configuration while being heated by blowing steam into the soybean slurry from a steam outlet provided at the distal end of a steam pipe protruding into the inside of the small diameter pipe bent in a turning configuration, and
    (C) partway through the heating step (B), deaerating the soybean slurry for removing air bubbles mixed in with the soybean slurry.

2. The production method for processed soybean food products according to claim 1, wherein the steam outlet that opens facing the direction in which the soybean slurry is circulating.

3. The production method for processed soybean food products according to claim 1, wherein the diameter of the small diameter pipe bent in a turning configuration is within a range from ¾ to ⅕ of the large diameter pipe arranged in a straight line.

4. The production method for processed soybean food products according to claim 1, wherein the heating step (B) and the deaeration step (C) are performed continuously.

5. The production method for processed soybean food products according to claim 1, wherein the heating step (B) comprises a first heating step in which a temperature of the soybean slurry is raised to a predetermined intermediate temperature and a second heating step in which the soybean slurry is further heated, and wherein the deaeration step (C) is performed between the first heating step and the second heating step.

6. The production method for processed soybean food products according to claim 1, wherein the deaeration step (C) is performed at the point when the soybean slurry reaches a temperature range of from about 75 to about 125° C. in the heating step (B).

7. The production method for processed soybean food products according to claim 1, wherein the deaeration step (C) is performed at the point when the soybean slurry reaches a temperature range of from about 75 to about 100° C. in the heating step (B).

8. The production method for processed soybean food products according to claim 1, wherein in the deaeration step (C) for removing air bubbles the soybean slurry is depressurized such that the temperature of the soybean slurry decreases by at least about 3° C. or more.

9. The production method for processed soybean food products according to claim 1, wherein, in the small diameter pipe that is bent in a turning configuration, the soybean slurry is heated by steam being blown into the soybean slurry.

* * * * *